United States Patent
Lee et al.

(10) Patent No.: US 10,637,848 B2
(45) Date of Patent: Apr. 28, 2020

(54) APPARATUS FOR SUPPORTING AUTHENTICATION BETWEEN DEVICES IN RESOURCE-CONSTRAINED ENVIRONMENT AND METHOD FOR THE SAME

(71) Applicant: ELECTRONICS AND TELECOMMUNICATIONS RESEARCH INSTITUTE, Daejeon (KR)

(72) Inventors: Yun-Kyung Lee, Daejeon (KR); Young-Ho Kim, Daejeon (KR); Jeong-Nyeo Kim, Daejeon (KR); Jae-Deok Lim, Sejong (KR); Bo-Heung Chung, Daejeon (KR); Hong-Il Ju, Daejeon (KR); Yong-Sung Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 274 days.

(21) Appl. No.: 15/814,193

(22) Filed: Nov. 15, 2017

(65) Prior Publication Data
US 2018/0159846 A1    Jun. 7, 2018

(30) Foreign Application Priority Data

Dec. 7, 2016 (KR) .......... 10-2016-0165784
Jun. 30, 2017 (KR) .......... 10-2017-0083471

(51) Int. Cl.
*H04L 29/06* (2006.01)
*H04L 9/32* (2006.01)
(Continued)

(52) U.S. Cl.
CPC .......... *H04L 63/0823* (2013.01); *H04L 9/30* (2013.01); *H04L 9/3247* (2013.01); (Continued)

(58) Field of Classification Search
CPC ..... H04L 63/0823; H04L 9/30; H04L 9/3247; H04L 9/3265; H04L 9/3268; H04W 12/06
(Continued)

(56) References Cited

U.S. PATENT DOCUMENTS 6,367,009 B1 * 4/2002 Davis .............. H04L 63/0442
713/152
7,478,236 B2 1/2009 Roh et al.
(Continued)

FOREIGN PATENT DOCUMENTS

| KR | 10-0947119 B1 | 3/2010 |
| KR | 10-1498380 B1 | 3/2015 |
| KR | 10-2016-0130870 A | 11/2016 |

*Primary Examiner* — Michael S McNally

(57) ABSTRACT

Disclosed herein is an apparatus for supporting authentication between devices, which includes a certificate information storage unit for storing certificate data of a first terminal for managing a certificate; a communication unit for receiving a request for a certificate of the first terminal, which uses a signature value and certificate-related information corresponding to the first terminal, from a second terminal and returning information corresponding to a valid certificate of the first terminal to the second terminal in order to enable the second terminal to authenticate the first terminal; and a certificate verification unit for verifying whether a certificate of the first terminal is valid.

20 Claims, 8 Drawing Sheets

(51) Int. Cl.
*H04W 12/06* (2009.01)
*H04L 9/30* (2006.01)
*H04W 12/00* (2009.01)
*H04W 4/70* (2018.01)
*H04W 84/18* (2009.01)

(52) U.S. Cl.
CPC .......... *H04L 9/3265* (2013.01); *H04L 9/3268* (2013.01); *H04W 12/003* (2019.01); *H04W 12/06* (2013.01); *H04W 4/70* (2018.02); *H04W 84/18* (2013.01)

(58) Field of Classification Search
USPC ....................................................... 713/158
See application file for complete search history.

(56) References Cited

U.S. PATENT DOCUMENTS

| | | | |
|---|---|---|---|
| 8,116,451 B2 | 2/2012 | Johnson | |
| 8,412,939 B2 | 4/2013 | Shon et al. | |
| 9,781,100 B2 | 10/2017 | Case et al. | |
| 2003/0084294 A1* | 5/2003 | Aoshima | G06F 21/6245 713/169 |
| 2003/0237004 A1* | 12/2003 | Okamura | H04L 63/0272 726/15 |

* cited by examiner

APPARATUS FOR SUPPORTING AUTHENTICATION BETWEEN DEVICES IN RESOURCE-CONSTRAINED ENVIRONMENT AND METHOD FOR THE SAME

CROSS REFERENCE TO RELATED APPLICATIONS

This application claims the benefit of Korean Patent Application No. 10-2016-0165784, filed Dec. 7, 2016, and No. 10-2017-0083471, filed Jun. 30, 2017, which are hereby incorporated by reference in their entirety into this application.

BACKGROUND OF THE INVENTION

1. Technical Field

The present invention relates to an apparatus and method for supporting authentication between short-range wireless communication devices using certificates in a resource-constrained environment.

2. Description of the Related Art

Authentication techniques using certificates are widely used because of the high security thereof. In order to apply authentication techniques using certificates, it is necessary for devices to store their certificates and certificate chains, but many devices used in an Internet of Things (IoT) environment are resource-constrained devices having no storage or insufficient storage.

Also, in the IoT environment, devices wirelessly communicate with each other using Wi-Fi, ZigBee, Bluetooth Low Energy (BLE), or the like. However, wireless devices using ZigBee, BLE, or the like, commonly used in a Wireless Personal Area Network (WPAN), have a limitation as to the amount of data that can be sent simultaneously due to data transmission bandwidth. Therefore, in order to send a certificate chain, it is necessary to divide an authentication request message into segments before sending it, and a receiver has difficulty reassembling the received segments of the message.

As described above, a conventional authentication system requires exchange of certificates between terminals, in which case segmentation of a message on a sender's side and reassembly thereof on a receiver's side may cause inefficiency. Accordingly, technology for efficiently performing authentication between devices in a resource-constrained environment is required.

The related art described above was obtained by the inventors for the purpose of developing the present invention or was obtained during the process of developing the present invention. It should be appreciated that this information did not necessarily belong to the public domain before the patent filing date of the present invention.

DOCUMENTS OF RELATED ART (Patent Document 1) Korean Patent Application Publication No. 10-2016-0130870.

SUMMARY OF THE INVENTION

An object of the present invention is to provide an apparatus for supporting authentication between devices in a resource-constrained environment, which stores certificates of devices to be authenticated and verifies certificate chains of the devices on behalf of the devices, and a method for the same.

An embodiment of the present invention provides an apparatus for supporting authentication between devices, which includes a certificate information storage unit for storing certificate data of a first terminal for managing a certificate; a communication unit for receiving a request for a certificate of the first terminal, which uses a signature value and certificate-related information corresponding to the first terminal, from a second terminal and returning information corresponding to a valid certificate of the first terminal to the second terminal in order to enable the second terminal to authenticate the first terminal; and a certificate verification unit for verifying whether a certificate of the first terminal is valid.

Here, the certificate verification unit may perform verification including at least one of verification of a validity period of a certificate of the first terminal, verification of whether the certificate has been revoked, and verification of a certificate chain of the first terminal.

Here, the certificate data may include one or more of a certificate of the first terminal and a certificate chain of the first terminal.

Here, the certificate-related information may include a serial number of a certificate of the first terminal and information about an address of the apparatus for supporting authentication that is capable of storing certificate data and providing information corresponding to a certificate.

Here, the information corresponding to the valid certificate may be information corresponding to a certificate that was successfully verified, among certificates of the first terminal.

Here, the information corresponding to the valid certificate may include one or more of the valid certificate of the first terminal and a public key corresponding to the valid certificate of the first terminal.

Here, the communication unit may return the information corresponding to the valid certificate of the first terminal to the second terminal only when the certificate of the first terminal is successfully verified.

Here, the communication unit may establish a secure channel with the second terminal, and may return the information corresponding to the valid certificate of the first terminal to the second terminal using the secure channel.

Here, the communication unit may receive the request for a certificate of the first terminal from the second terminal via a relay device, and may return the information corresponding to the valid certificate of the first terminal to the second terminal via the relay device.

Another embodiment of the present invention provides a method for supporting authentication between devices, which includes storing certificate data of a first terminal for managing a certificate; receiving a request for a certificate of the first terminal, which uses a signature value and certificate-related information corresponding to the first terminal, from a second terminal; verifying whether a certificate of the first terminal is valid; and returning information corresponding to a valid certificate of the first terminal to the second terminal in order to enable the second terminal to authenticate the first terminal.

Here, verifying whether the certificate of the first terminal is valid may be configured to perform verification including at least one of verification of a validity period of the certificate of the first terminal, verification of whether the certificate has been revoked, and verification of a certificate chain of the first terminal.

Here, the certificate data may include one or more of a certificate of the first terminal and a certificate chain of the first terminal.

Here, the certificate-related information may include a serial number of a certificate of the first terminal and information about an address of an apparatus for supporting authentication that is capable of storing certificate data and providing information corresponding to a certificate.

Here, the information corresponding to the valid certificate may be information corresponding to a certificate that was successfully verified, among certificates of the first terminal.

Here, the information corresponding to the valid certificate may include one or more of the valid certificate of the first terminal and a public key corresponding to the valid certificate of the first terminal.

Here, returning the information may be configured to return the information corresponding to the valid certificate of the first terminal to the second terminal only when the certificate of the first terminal is successfully verified.

Here, returning the information may be configured to establish a secure channel with the second terminal and to return the information corresponding to the valid certificate of the first terminal to the second terminal using the secure channel.

Here, receiving the request for a certificate may be configured to receive the request for a certificate of the first terminal from the second terminal via a relay device, and returning the information may be configured to return the information corresponding to the valid certificate of the first terminal to the second terminal via the relay device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
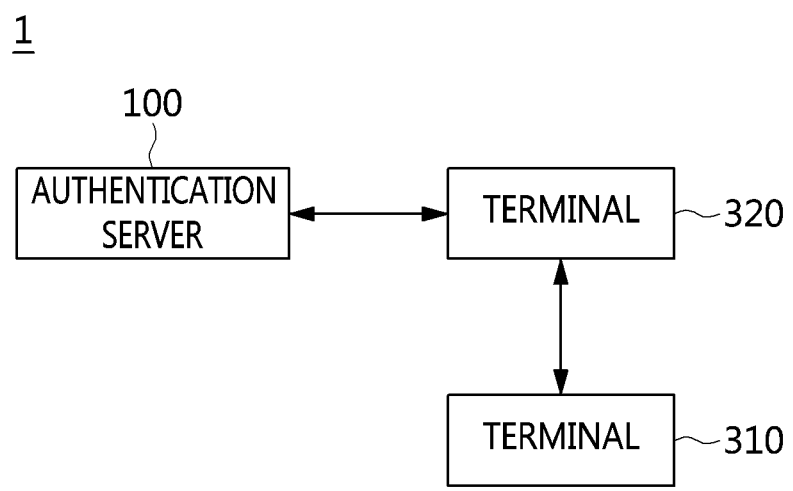
FIG. 1 is a view that shows the configuration of a system for supporting authentication between devices in a resource-constrained environment according to an embodiment of the present invention.

The present invention may be variously changed, and may have various embodiments, and specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, but all or some of the embodiments may be selectively combined and configured, so that the embodiments may be modified in various ways. It will be understood that, although the terms "first," "second," etc. may be used herein to describe various elements, these elements should not be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows the configuration of a system 1 for supporting authentication between devices in a resource-constrained environment according to an embodiment of the present invention.

Referring to FIG. 1, the system 1 for supporting authentication between devices in a resource-constrained environment according to an embodiment of the present invention includes a first terminal or device 310 to be authenticated, a second terminal or device 320 for authenticating the first terminal or device 310, an authentication server or apparatus 100 for supporting authentication between devices in a resource-constrained environment, and the like.

The first terminal 310 to be authenticated is connected with the second terminal 320 for authenticating the first terminal 310, and the second terminal 320 is connected with the authentication server 100.

Here, the authentication server 100 may represent a Certificate Authority (CA). Also, the authentication server 100 may use Online Certificate Status Protocol (OCSP) and Lightweight Directory Access Protocol (LDAP) in order to check the validity of certificates.

Figure 2:
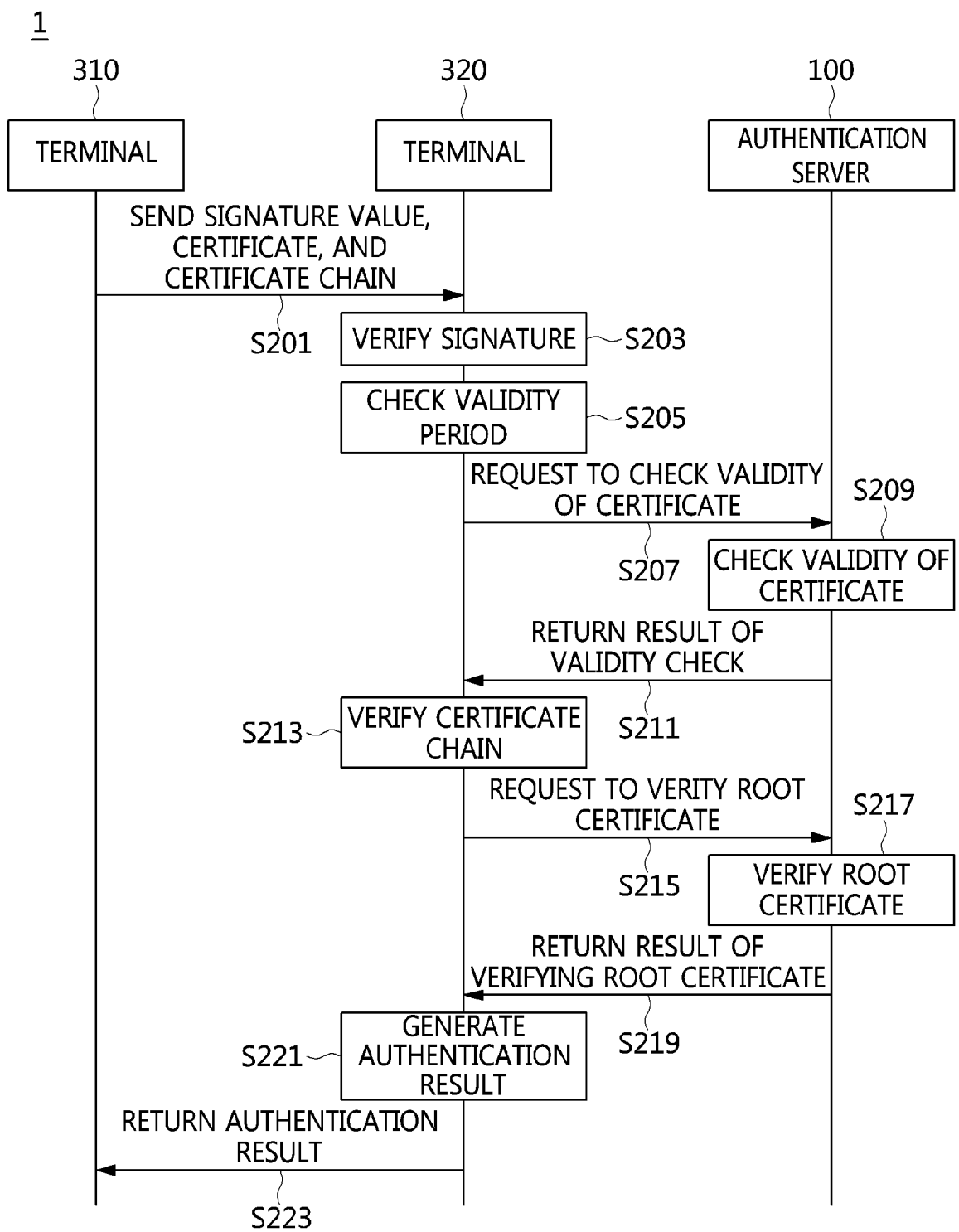
FIG. 2 is a view that shows the operating process of a system for supporting authentication between devices in a resource-constrained environment according to an embodiment of the present invention.

FIG. 2 is a view that shows the operating process of the system 1 for supporting authentication between devices in a resource-constrained environment according to an embodiment of the present invention.

Referring to FIG. 2, in the system 1 for supporting authentication between devices in a resource-constrained environment according to an embodiment of the present invention, the first terminal 310 sends a signature value signed with a private key thereof, a certificate thereof, and a certificate chain thereof to the second terminal 320 at step S201 in order to be authenticated.

Also, in the system 1 for supporting authentication between devices in a resource-constrained environment according to an embodiment of the present invention, the second terminal 320 verifies the signature value, received from the first terminal 310, at step S203 and checks the validity period of the certificate at step S205.

Also, in the system 1 for supporting authentication between devices in a resource-constrained environment according to an embodiment of the present invention, the second terminal 320 requests the authentication server 100 to check the validity of the certificate at step S207 in order to check whether the certificate of the first terminal 310 is valid (or has been revoked).

Also, in the system 1 for supporting authentication between devices in a resource-constrained environment according to an embodiment of the present invention, the authentication server 100 checks the validity of the certificate at step S209 and returns the result of checking to the second terminal 320 at step S211.

Also, in the system 1 for supporting authentication between devices in a resource-constrained environment according to an embodiment of the present invention, the second terminal 320 verifies the certificate chain at step S213 in order to check whether the corresponding certificate was issued by a trusted certificate authority. To this end, the second terminal 320 requests the authentication server 100 to verify a root certificate at step S215.

Also, in the system 1 for supporting authentication between devices in a resource-constrained environment according to an embodiment of the present invention, the authentication server 100 verifies the root certificate at step S217 and returns the result of verification to the second terminal 320 at step S219.

Also, in the system 1 for supporting authentication between devices in a resource-constrained environment according to an embodiment of the present invention, the second terminal 320 generates a result of authentication of the first terminal 310 at step S221 and returns the result to the first terminal 310 at step S223.

Figure 3:
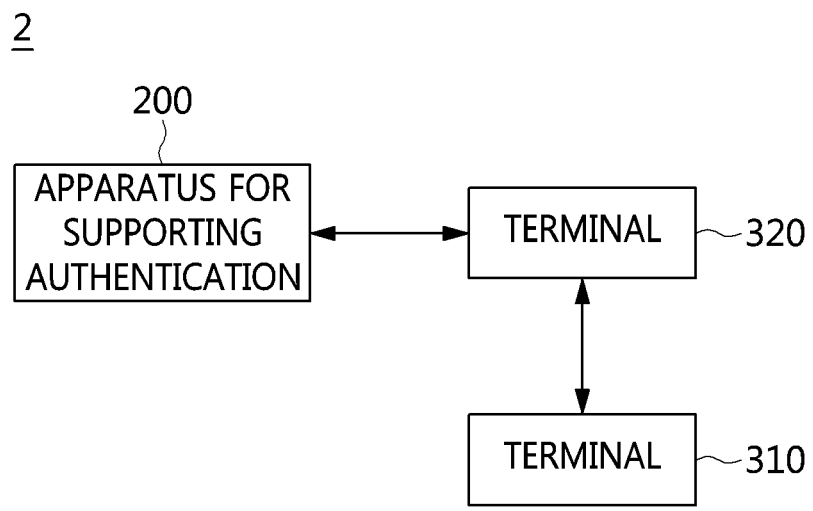
FIG. 3 is a view that shows the configuration of a system for supporting authentication between devices in a resource-constrained environment according to an embodiment of the present invention.

FIG. 3 is a view that shows the configuration of a system 2 for supporting authentication between devices in a resource-constrained environment according to an embodiment of the present invention.

Referring to FIG. 3, the system 2 for supporting authentication between devices in a resource-constrained environment according to an embodiment of the present invention includes a first terminal or device 310 to be authenticated, a second terminal or device 320 for authenticating the first terminal or device 310, an authentication server or apparatus 200 for supporting authentication between devices in a resource-constrained environment, and the like.

Here, the first terminal 310 to be authenticated is connected with the second terminal 320 for authenticating the first terminal 310, and the second terminal 320 is connected with the apparatus 200 for supporting authentication between devices in a resource-constrained environment.

Specifically, when the first terminal 310 requests authentication from the second terminal 320, the first terminal 310 sends the second terminal 320 a signature value and certificate-related information, rather than a certificate and a certificate chain. Then, using the received certificate-related information, the second terminal 320 requests a certificate of the first terminal 310 from the apparatus 200 for supporting authentication. The apparatus 200 for supporting authentication checks the validity of certificates for the first terminal 310 and sends information corresponding to a valid certificate, acquired depending on the result of checking the validity, to the second terminal 320. The second terminal 320 verifies the signature of the first terminal 310 using the received information corresponding to the valid certificate, generates an authentication result, and returns the authentication result to the first terminal 310.

Here, the information corresponding to the valid certificate may be information corresponding to a certificate that was successfully verified, among certificates of the first terminal 310. That is, when multiple certificates for the first terminal 310 are stored, if there is a certificate that was successfully verified, information corresponding thereto may become the information corresponding to the valid certificate.

Here, the apparatus 200 for supporting authentication may perform verification including at least one of verification of the validity period of a certificate of the first terminal 310, verification of whether the certificate has been revoked, and a chain certificate verification.

Here, the apparatus 200 for supporting authentication may store certificate data for the first terminal 310.

Here, the certificate data may include one or more of a certificate of the first terminal 310 and a certificate chain of the first terminal 310.

Here, the certificate-related information may include one or more of a serial number of a certificate and the address of an apparatus for supporting authentication (the address of an authentication server) that is capable of storing certificate data and providing information corresponding to a certificate.

Here, the information corresponding to the valid certificate may include one or more of the valid certificate of the first terminal 310 and a public key corresponding to the valid certificate of the first terminal 310.

Here, only when a certificate of the first terminal 310 that was successfully verified is present may the apparatus 200 for supporting authentication return information corresponding thereto to the second terminal 320.

Also, the apparatus 200 for supporting authentication may establish a secure channel with the second terminal 320, and may return the information corresponding to the valid certificate of the first terminal 310 to the second terminal 320 using the secure channel.

That is, the apparatus 200 for supporting authentication may return one or more of the valid certificate of the first terminal 310 and a public key corresponding to the valid certificate of the first terminal 310 to the second terminal 320 using the secure channel.

For example, the apparatus 200 for supporting authentication may directly return a public key corresponding to the valid certificate of the first terminal 310 to the second terminal 320 using the secure channel.

The apparatus 200 for supporting authentication may be a certificate authority that is capable of issuing and managing certificates, but may be a local server configured to perform an authentication function on behalf of the certificate authority.

As described above, when a terminal requests authentication from a different terminal, the terminal sends different terminal certificate-related information for acquiring a certificate, rather than its certificate and certificate chain, whereby the amount of data to be sent may be significantly reduced.

Also, a terminal for authenticating a different terminal in response to an authentication request received therefrom does not solely perform the processes of checking the validity period of a certificate, checking whether the certificate has been revoked, and verifying a certificate chain, whereby the load incurred when the terminal performs authentication by itself may be significantly reduced.

Also, because there is no need to send a certificate and a certificate chain for authentication between terminals, fragmentation of a message and reassembly of the fragmented messages are not required, thus preventing unnecessary waste of resources.

Figure 4:
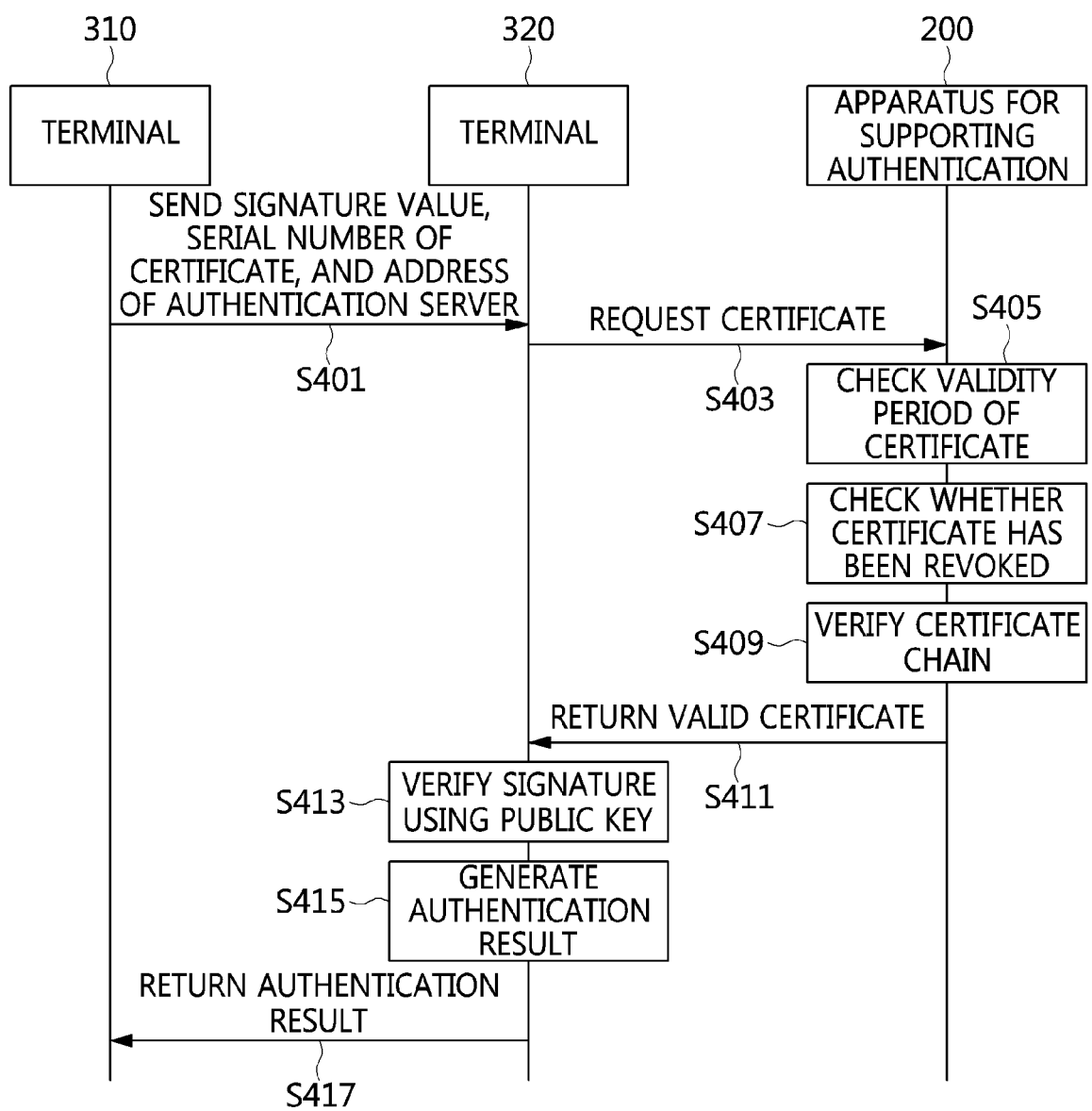
FIG. 4 is a view that shows the operating process of a system for supporting authentication between devices in a resource-constrained environment according to an embodiment of the present invention.

FIG. 4 is a view that shows the operating process of the system 2 for supporting authentication between devices in a resource-constrained environment according to an embodiment of the present invention.

Referring to FIG. 4, in the system 2 for supporting authentication between devices in a resource-constrained environment according to an embodiment of the present invention, the first terminal 310, which needs to be authenticated, sends a signature value generated by itself and information related to a certificate of the first terminal 310 to the second terminal 320 at step S401.

Here, the certificate-related information may include one or more of a serial number of a certificate and the address of the apparatus for supporting authentication (the address of an authentication server).

Also, in the system 2 for supporting authentication between devices in a resource-constrained environment according to an embodiment of the present invention, the second terminal 320 requests a certificate of the first terminal 310 from the apparatus 200 for supporting authentication at step S403.

Also, in the system 2 for supporting authentication between devices in a resource-constrained environment according to an embodiment of the present invention, the apparatus 200 for supporting authentication checks the validity period of a certificate of the first terminal 310 at step S405.

Also, in the system 2 for supporting authentication between devices in a resource-constrained environment according to an embodiment of the present invention, the apparatus 200 for supporting authentication checks at step S407 whether a certificate of the first terminal 310 has been revoked.

Also, in the system 2 for supporting authentication between devices in a resource-constrained environment according to an embodiment of the present invention, the apparatus 200 for supporting authentication verifies a certificate chain for a certificate of the first terminal 310 at step S409.

Also, in the system 2 for supporting authentication between devices in a resource-constrained environment according to an embodiment of the present invention, the apparatus 200 for supporting authentication returns a valid certificate to the second terminal 320 at step S411 by checking the validity of certificates of the first terminal 310. That is, when it is determined as a result of checking the validity of certificates that there is no valid certificate, a certificate may not be returned.

If a secure channel is established between the apparatus 200 for supporting authentication and the second terminal 320, the apparatus 200 for supporting authentication may send only a public key included in the certificate of the first terminal 310 to the terminal 320 using the corresponding channel.

Also, in the system 2 for supporting authentication between devices in a resource-constrained environment according to an embodiment of the present invention, the second terminal 320 verifies the signature value received from the first terminal 310 at step S413 using the public key of the certificate of the first terminal 310.

Also, in the system 2 for supporting authentication between devices in a resource-constrained environment according to an embodiment of the present invention, the second terminal 320 generates a result of authentication of the first terminal 310 at step S415 and returns the authentication result to the first terminal 310 at step S417.

If authentication succeeds, an authentication success message may be delivered to the first terminal 310, but if authentication fails, an authentication failure message may be delivered thereto.

In an alternative embodiment, among the above-described steps S401, S403, S405, S407, S409, S411, S413, S415 and S417, checking the validity period of a certificate at step S405 and checking whether a certificate has been revoked at step S407 may be performed in parallel.

In an alternative embodiment, among the above-described steps S401, S403, S405, S407, S409, S411, S413, S415 and S417, checking whether a certificate has been revoked at step S407 and verifying a certificate chain at step S409 may be performed in parallel.

In an alternative embodiment, among the above-described steps S401, S403, S405, S407, S409, S411, S413, S415 and S417, checking the validity period of a certificate at step S405, checking whether a certificate has been revoked at step S407, and verifying a certificate chain at step S409 may be performed in parallel.

In an alternative embodiment, among the above-described steps S401, S403, S405, S407, S409, S411, S413, S415 and S417, checking whether a certificate has been revoked at step S407 may be performed before checking the validity period of a certificate at step S405.

In an alternative embodiment, among the above-described steps S401, S403, S405, S407, S409, S411, S413, S415 and S417, verifying a certificate chain at step S409 may be performed before checking whether a certificate has been revoked at step S407.

In an alternative embodiment, among the above-described steps S401, S403, S405, S407, S409, S411, S413, S415 and S417, verifying a certificate chain at step S409 may be performed before checking the validity period of a certificate at step S405.

Figure 5:
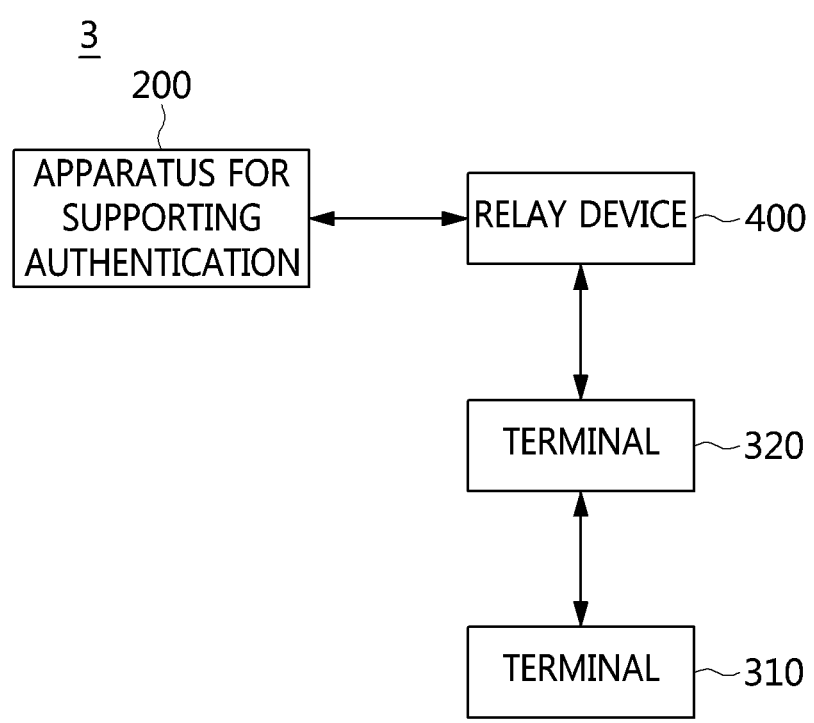
FIG. 5 is a view that shows the configuration of a system for supporting authentication between devices in a resource-constrained environment according to an embodiment of the present invention.

FIG. 5 is a view that shows the configuration of a system 3 for supporting authentication between devices in a resource-constrained environment according to an embodiment of the present invention.

Referring to FIG. 5, the system 3 for supporting authentication between devices in a resource-constrained environment according to an embodiment of the present invention includes a first terminal or device 310 to be authenticated, a second terminal or device 320 for authenticating the first terminal or device 310, an authentication server or apparatus 200 for supporting authentication between devices in a resource-constrained environment, a relay device 400 for relaying between the apparatus 200 for supporting authentication and the second terminal 320, and the like.

Here, the first terminal 310 that needs to be authenticated is connected with the second terminal 320 for authenticating the first terminal 310, the second terminal 320 is connected with the relay device 400, and the relay device 400 is connected with the apparatus 200 for supporting authentication.

This system is configured such that a gateway or a local server is delegated to access the apparatus 200 for supporting authentication when the terminals 310 and 320 are not able to directly access the apparatus 200 for supporting authentication using only a Wireless Personal Area Network (WPAN).

Specifically, when the first terminal 310 requests authentication from the second terminal 320, the first terminal 310 sends the second terminal 320 a signature value and certificate-related information, rather than a certificate and a certificate chain. Then, the second terminal 320 requests a certificate of the first terminal 310 from the relay device 400 using the received certificate-related information, and the relay device 400 requests a certificate of the first terminal 310 from the apparatus 200 for supporting authentication in place of the second terminal 320. Then, the apparatus 200 for supporting authentication checks the validity of certificates for the first terminal 310 and sends information corresponding to a valid certificate to the relay device 400, the relay device 400 delivers the received information to the second terminal 320, and the second terminal 320 verifies the signature of the first terminal 310 using the received information corresponding to the valid certificate, generates an authentication result, and returns the authentication result to the first terminal 310.

Here, the information corresponding to the valid certificate may be information corresponding to a certificate that was successfully verified, among certificates of the first terminal 310. That is, when multiple certificates of the first terminal 310 are stored, if a certificate that was successfully verified is present, information corresponding thereto may become the information corresponding to the valid certificate.

Here, the apparatus 200 for supporting authentication may perform verification including at least one of verification of the validity period of a certificate of the first terminal 310, verification of whether the certificate has been revoked, and certificate chain verification.

Here, the apparatus 200 for supporting authentication may store certificate data of the first terminal 310.

Here, the certificate data may include one or more of a certificate of the first terminal 310 and a certificate chain of the first terminal 310.

Here, the certificate-related information may include one or more of a serial number of a certificate and the address of the apparatus for supporting authentication (the address of an authentication server) that is capable of storing certificate data and providing information corresponding to a certificate.

Here, the information corresponding to the valid certificate may include one or more of the valid certificate of the first terminal 310 and a public key corresponding to the valid certificate of the first terminal 310.

Here, only when a verified certificate of the first terminal 310 is present may the apparatus 200 for supporting authentication return information corresponding to the verified certificate to the second terminal 320.

Also, the apparatus 200 for supporting authentication may establish a secure channel with the second terminal 320, and may return the information corresponding to the valid certificate of the first terminal 310 to the second terminal 320 using the secure channel.

That is, the apparatus 200 for supporting authentication may return one or more of the valid certificate of the first terminal 310 and a public key corresponding thereto to the second terminal 320 using the secure channel.

For example, the apparatus 200 for supporting authentication may directly return a public key corresponding to the valid certificate of the first terminal 310 to the second terminal 320 using the secure channel.

The apparatus 200 for supporting authentication may be a certificate authority that is capable of issuing and managing certificates, but may alternatively be a local server configured to perform an authentication function on behalf of the certificate authority.

The relay device 400 includes a gateway or local server that is capable of managing the terminals 310 and 320.

Figure 6:
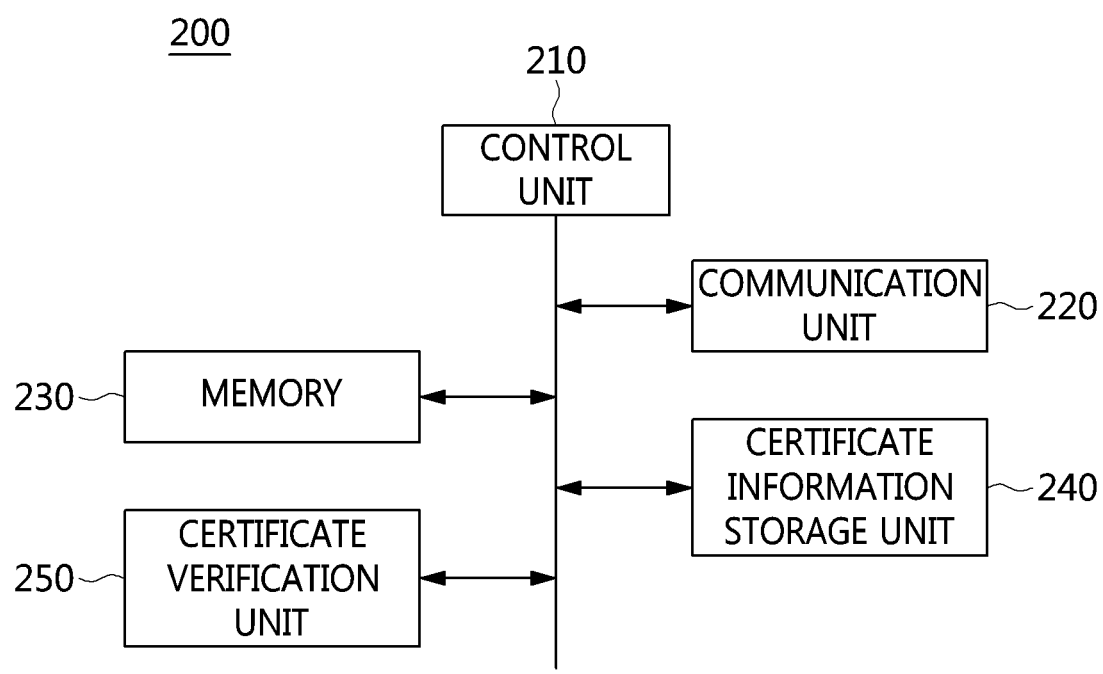
FIG. 6 is a block diagram that shows an apparatus for supporting authentication between devices in a resource-constrained environment according to an embodiment of the present invention.

FIG. 6 is a block diagram that shows an apparatus 200 for supporting authentication between devices in a resource-constrained environment according to an embodiment of the present invention.

Referring to FIG. 6, the apparatus 200 for supporting authentication between devices in a resource-constrained environment according to an embodiment of the present invention includes a control unit 210, a communication unit 220, memory 230, a certificate information storage unit 240, and a certificate verification unit 250.

Specifically, the control unit 210, which is a kind of central processing unit, controls the overall process for supporting authentication between devices in a resource-constrained environment. That is, the control unit 210 may provide various functions by controlling the communication unit 220, the memory 230, the certificate information storage unit 240, the certificate verification unit 250, and the like.

Here, the control unit 210 may include all kinds of devices capable of processing data, such as a processor or the like. Here, a 'processor' may indicate, for example, a data processing device embedded in hardware, which has a physically structured circuit for performing functions represented as code or instructions included in a program. An example of such a data processing device embedded in hardware may include processing devices, such as a microprocessor, a central processing unit (CPU), a processor core, a multiprocessor, an application-specific integrated circuit (ASIC), a field-programmable gate array (FPGA), and the like, but the present invention is not limited thereto.

The communication unit 220 provides a communication interface that is necessary in order to send and receive signals between terminals (310 and 320 in FIG. 3) and an apparatus 200 for supporting authentication between devices in a resource-constrained environment.

Here, the communication unit 220 may provide a communication interface that is necessary in order to send and receive signals between a relay device (400 in FIG. 5) and an apparatus 200 for supporting authentication between devices in a resource-constrained environment.

Here, the communication unit 220 may be a device including hardware and software that are necessary in order to send and receive signals, such as control signals or data signals, through a wired or wireless connection with another network device.

Here, the communication unit 220 may receive a request for a certificate of a terminal (310 in FIG. 3), which uses a signature value and certificate-related information corresponding to the terminal (310 in FIG. 3), from a different terminal (320 in FIG. 3), and may return information corresponding to a valid certificate, acquired as a result of verification of certificates, to the different terminal (320 in FIG. 3) in order to enable the different terminal (320 in FIG. 3) to authenticate the terminal (310 in FIG. 3).

Here, the communication unit 220 may receive a request for a certificate of a terminal (310 in FIG. 3), which uses a signature value and certificate-related information corresponding to the terminal (310 in FIG. 3), from a different terminal (320 in FIG. 3) via a relay device (400 in FIG. 5), and may return information corresponding to a valid certificate, acquired as a result of verification of certificates, to the different terminal (320 in FIG. 3) via the relay device (400 in FIG. 5) in order to enable the different terminal (320 in FIG. 3) to authenticate the terminal (310 in FIG. 3).

Here, the information corresponding to the valid certificate may be information corresponding to a certificate that was successfully verified, among certificates of the terminal (310 in FIG. 3). That is, when multiple certificates of the terminal (310 in FIG. 3) are stored, if there is a certificate that was successfully verified, information corresponding thereto may become the information corresponding to the valid certificate.

Here, the certificate-related information may include one or more of a serial number of a certificate and the address of an apparatus for supporting authentication (the address of an authentication server) that is capable of storing certificate data and providing information corresponding to a certificate.

Here, the information corresponding to the valid certificate may include one or more of a valid certificate of the terminal (310 in FIG. 3) and a public key corresponding to the valid certificate of the terminal (310 in FIG. 3).

Here, the communication unit 220 may establish a secure channel with the different terminal (320 in FIG. 3), and may return the information corresponding to the valid certificate of the terminal (310 in FIG. 3) to the different terminal (320 in FIG. 3) using the secure channel.

That is, the communication unit 220 may return one or more of the valid certificate of the terminal (310 in FIG. 3) and a public key corresponding thereto to the different terminal (320 in FIG. 3) using the secure channel.

For example, the communication unit 220 may directly return a public key corresponding to the valid certificate of the terminal (310 in FIG. 3) to the different terminal (320 in FIG. 3) using the secure channel.

The memory 230 functions to temporarily or permanently store data processed by the control unit 210. Here, the memory 230 may include magnetic storage media or flash storage media, but the present invention is not limited thereto.

The certificate information storage unit 240 stores certificate data of terminals (310 and 320 in FIG. 3) that are managed by the apparatus 200 for supporting authentication between devices in a resource-constrained environment.

Here, the certificate data may include one or more of a certificate of a terminal and a certificate chain of the terminal.

The certificate verification unit 250 verifies a certificate of a terminal (310 in FIG. 3) when it receives a request for the certificate of the terminal (310 in FIG. 3).

Here, the certificate verification unit 250 may check the validity period of a certificate to be verified and thereby check whether the validity period has expired.

Here, the certificate verification unit 250 may check whether a certificate to be verified is valid by checking whether the certificate has been revoked.

Here, the certificate verification unit 250 verifies a certificate chain for a certificate to be verified, and may thereby check whether the certificate is issued by a trusted certificate authority.

If the certificate is verified by the certificate verification unit 250, because the certificate is a valid certificate, it may be sent to the terminal that requested information corresponding to the certificate.

Here, only when a certificate that was successfully verified is present may the certificate verification unit 250 return information corresponding thereto to the different terminal (320 in FIG. 3).

That is, rather than directly sending and receiving certificates between terminals for authentication, an apparatus 200 for supporting authentication between devices in a resource-constrained environment stores certificates and certificate chains of the terminals and returns information corresponding to a valid certificate in response to a request for a certificate, whereby the waste of resources consumed by terminals for authentication may be avoided.

Figure 7:
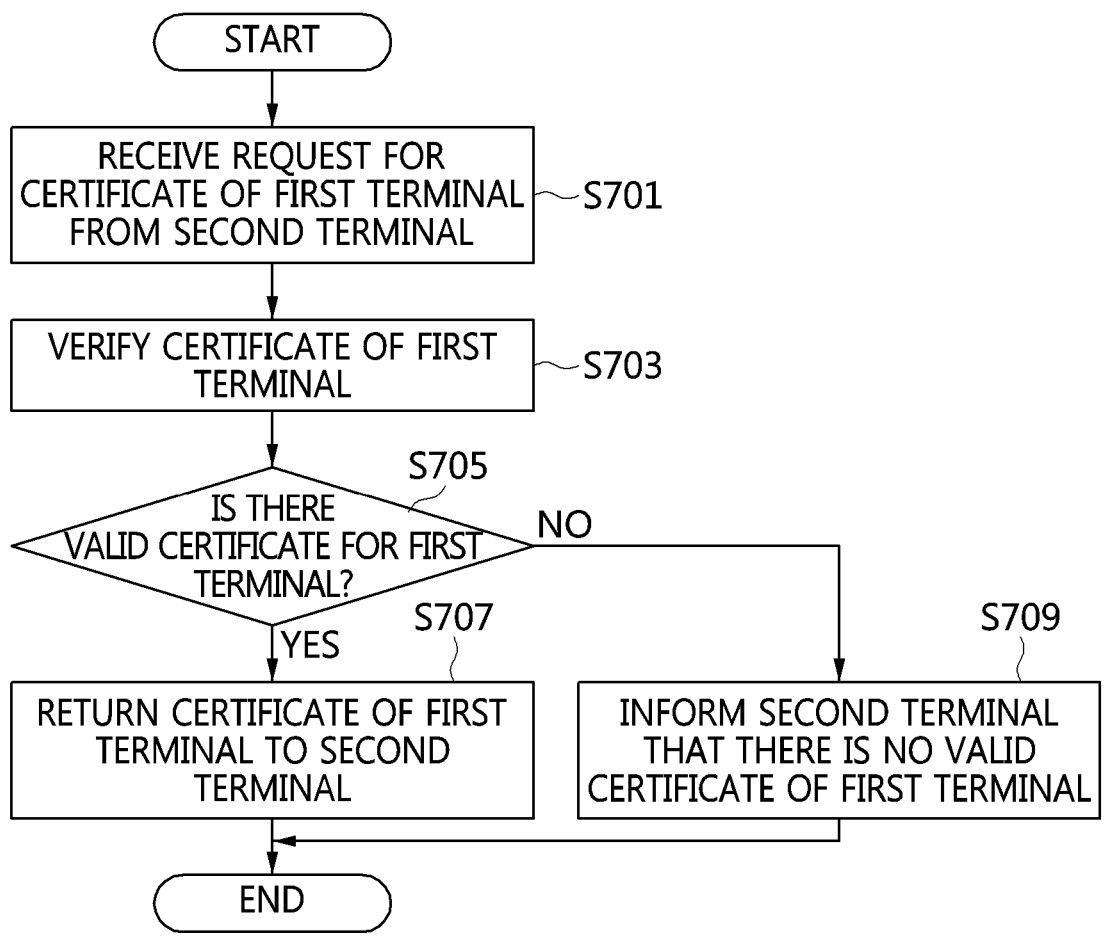
FIG. 7 is a flowchart that shows a method for supporting authentication between devices in a resource-constrained environment according to an embodiment of the present invention.

FIG. 7 is a flowchart that shows a method for supporting authentication between devices in a resource-constrained environment according to an embodiment of the present invention.

Referring to FIG. 7, in the method for supporting authentication between devices in a resource-constrained environment according to an embodiment of the present invention, an apparatus (200 in FIG. 3) for supporting authentication between devices in a resource-constrained environment receives a request for a certificate of a first terminal from a second terminal that intends to authenticate the first terminal at step S701.

Also, in the method for supporting authentication between devices in a resource-constrained environment according to an embodiment of the present invention, the apparatus (200 in FIG. 3) for supporting authentication between devices in a resource-constrained environment verifies certificates of the first terminal at step S703.

Also, in the method for supporting authentication between devices in a resource-constrained environment according to an embodiment of the present invention, the apparatus (200 in FIG. 3) for supporting authentication between devices in a resource-constrained environment determines whether there is a valid certificate for the first terminal at step S705.

When it is determined at step S705 that there is a valid certificate for the first terminal, the certificate for the first terminal is returned to the second terminal at step S707.

Here, a public key included in the certificate may be returned to the second terminal in place of the certificate.

When it is determined at step S705 that there is no valid certificate for the first terminal, the second terminal is informed that there is no valid certificate for the first terminal at step S709.

Figure 8:
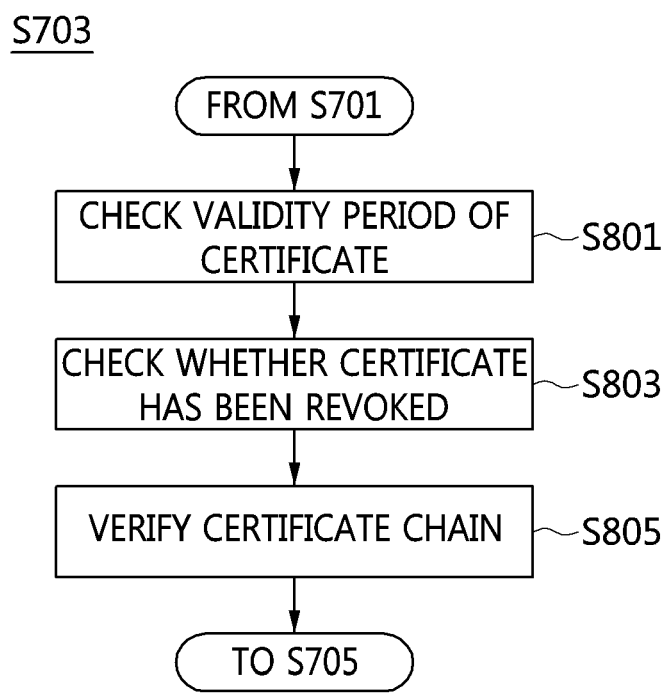
FIG. 8 is a flowchart that shows an example of the step of verifying a certificate, illustrated in FIG. 7.

FIG. 8 is a flowchart that shows an example of the step of verifying a certificate (S703) illustrated in FIG. 7.

Referring to FIG. 8, in the step of verifying a certificate (S703) illustrated in FIG. 7, whether the validity period of a certificate to be verified has expired is checked at step S801.

Also, in the step of verifying a certificate (S703) illustrated in FIG. 7, whether the certificate to be verified is a valid certificate is checked at step S803 by checking whether the certificate has been revoked.

Also, in the step of verifying a certificate (S703) illustrated in FIG. 7, whether the certificate to be verified is a certificate issued by a trusted certificate authority is checked at step S805 by verifying a certificate chain for the certificate.

In an alternative embodiment, among the above-described steps S801, S803 and S805, checking the validity period of a certificate at step S801, checking whether a certificate has been revoked at step S803, and verifying a certificate chain at step S805 may be performed in parallel.

In an alternative embodiment, among the above-described steps S801, S803 and S805, checking the validity period of a certificate at step S801 and checking whether a certificate has been revoked at step S803 may be performed in parallel.

In an alternative embodiment, among the above-described steps S801, S803 and S805, checking whether a certificate has been revoked at step S803 and verifying a certificate chain at step S805 may be performed in parallel.

In an alternative embodiment, among the above-described steps S801, S803, and S805, checking whether a certificate has been revoked at step S803 may be performed before checking the validity period of a certificate at step S801.

In an alternative embodiment, among the above-described steps S801, S803 and S805, verifying a certificate chain at step S805 may be performed before checking whether a certificate has been revoked at step S803.

In an alternative embodiment, among the above-described steps S801, S803 and S805, verifying a certificate chain at step S805 may be performed before checking the validity period of a certificate at step S801.

According to the present invention, the apparatus and method for supporting authentication between devices in a resource-constrained environment may store certificates of terminals to be authenticated and verify a certificate chain on behalf of the terminals, whereby problems, such as limitations as to the storage of the devices and network bandwidth, may be overcome, and an IoT environment in which security is effectively secured may be constructed.

Although specific embodiments have been described in the specification, they do not limit the scope of the present invention. For the conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, components may not be absolutely necessary.

Accordingly, the spirit of the present invention should not be limited to the above-described embodiments, and the entire scope of the appended claims and their equivalents will fall within the scope and spirit of the present invention.

What is claimed is:

1. An apparatus for supporting authentication between devices, comprising:
   an address; and
   a processor, wherein the processor controls the apparatus to perform:
   storing certificate data of a first terminal for managing a certificate;
   receiving from a second terminal a request for a certificate of the first terminal, the request being based on certificate-related information provided by the first terminal, the certificate-related information including a serial number of a certificate of the first terminal and an indication from the first terminal of the address of the apparatus;
   verifying whether the certificate of the first terminal is valid; and
   returning to the second terminal information corresponding to the valid certificate of the first terminal; the information configured to enable the second terminal to authenticate the first terminal.

2. The apparatus of claim 1, wherein verifying whether the certificate of the first terminal is valid includes at least one of verifying a validity period of the certificate of the first terminal, verifying whether the certificate has been revoked, and verifying a certificate chain of the first terminal.

3. The apparatus of claim 1, wherein the certificate data include one or more of the certificate of the first terminal and the certificate chain of the first terminal.

4. The apparatus of claim 1, wherein the information corresponding to the valid certificate is information corresponding to a certificate that was successfully verified, among certificates of the first terminal.

5. The apparatus of claim 1, wherein the information corresponding to the valid certificate includes one or more of the valid certificate of the first terminal and a public key corresponding to the valid certificate of the first terminal.

6. The apparatus of claim 1, wherein returning to the second terminal the information corresponding to the valid certificate of the first terminal is performed only when the certificate of the first terminal is successfully verified.

7. The apparatus of claim 6, wherein the processor controls the apparatus to further perform establishing a secure channel with the second terminal, and
   wherein returning the information corresponding to the valid certificate of the first terminal to the second terminal is performed using the secure channel.

8. The apparatus of claim 1, wherein the request for a certificate of the first terminal is received from the second terminal via a relay device, and
   wherein returning the information corresponding to the valid certificate of the first terminal is returned to the second terminal via the relay device.

9. A method for supporting authentication between devices and performed by an apparatus having an address, the method comprising:
   storing certificate data of a first terminal for managing a certificate;
   receiving a request from a second terminal for a certificate of the first terminal, the request being based on certificate-related information provided by the first terminal, the certificate-related information including an indication from the first terminal of the address of the apparatus;
   verifying whether a certificate of the first terminal is valid; and
   returning information corresponding to a valid certificate of the first terminal to the second terminal in order to enable the second terminal to authenticate the first terminal.

10. The method of claim 9, wherein verifying whether the certificate of the first terminal is valid is configured to perform verification of a validity period of the certificate of the first terminal, verification of whether the certificate has been revoked, and verification of a certificate chain of the first terminal.

11. The method of claim 9, wherein the certificate data include one or more of a certificate of the first terminal and a certificate chain of the first terminal.

12. The method of claim 9, wherein the certificate-related information includes a serial number of a certificate of the first terminal.

13. The method of claim 9 wherein the information corresponding to the valid certificate is information corresponding to a certificate that was successfully verified, among certificates of the first terminal.

14. The method of claim 9, wherein the information corresponding to the valid certificate returned to the second terminal includes one or more of the valid certificate of the first terminal and a public key corresponding to the valid certificate of the first terminal.

15. The method of claim 9, wherein returning the information is configured to return the information corresponding to the valid certificate of the first terminal to the second terminal only when the certificate of the first terminal is successfully verified.

16. The method of claim 9, wherein returning the information is configured to establish a secure channel with the second terminal and to return the information corresponding to the valid certificate of the first terminal to the second terminal using the secure channel.

17. The method of claim 9, wherein:
receiving the request for a certificate is configured to receive the request for a certificate of the first terminal from the second terminal via a relay device, and
returning the information is configured to return the information corresponding to the valid certificate of the first terminal to the second terminal via the relay device.

18. A method for authenticating a terminal, the method comprising:
receiving from the terminal a signature value, a certificate serial number, and information identifying an authentication server;
sending a request for information corresponding to a valid certificate of the terminal to the authentication server, the request including the certificate serial number;
receiving from the authentication server the information corresponding to the valid certificate of the terminal; and
authenticating the terminal using the signature value and the information corresponding to the valid certificate of the terminal.

19. The method of claim 18, wherein the information corresponding to the valid certificate of the terminal includes the valid certificate of the terminal.

20. The method of claim 18, further comprising:
receiving from the authentication server the information corresponding to the valid certificate of the terminal through a secure channel,
wherein the information corresponding to the valid certificate of the terminal includes a public key corresponding to the valid certificate of the terminal.

* * * * *